Sept. 29, 1959　　　　　　S. HORECKY　　　　　　2,906,952
DEVICE FOR MEASURING AND FOR REGULATING MOISTURE
CONTENT OF SOIL OR THE LIKE
Filed Jan. 10, 1955　　　　　　　　　　　　　　2 Sheets-Sheet 2

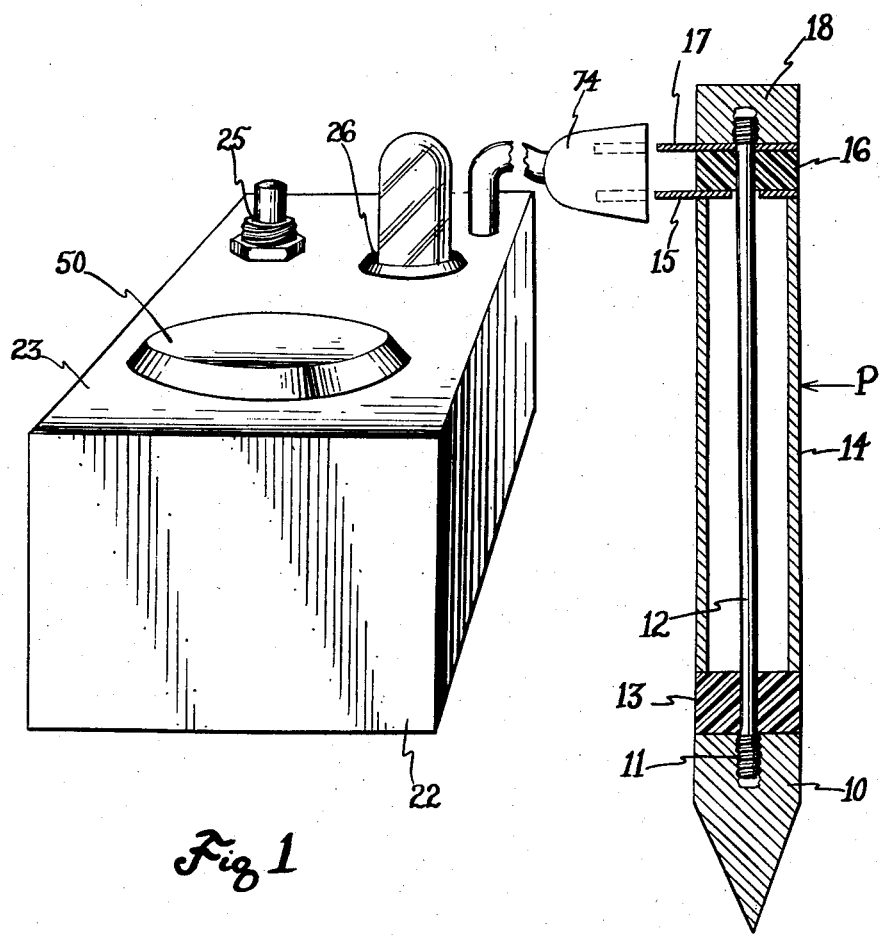

INVENTOR.
Stanley Horecky
BY John F. Brezina

United States Patent Office 2,906,952
Patented Sept. 29, 1959

2,906,952

DEVICE FOR MEASURING AND FOR REGULATING MOISTURE CONTENT OF SOIL OR THE LIKE

Stanley Horecky, Oak Park, Ill.

Application January 10, 1955, Serial No. 480,685

3 Claims. (Cl. 324—65)

This invention is directed to a device for measuring and indicating the moisture content of the soil or of masses of granular, comminuted or powder-like materials, and for automatically controlling water supplying devices.

It is an important object and accomplishment of my invention to provide a portable probing device or stoke adapted to be easily inserted into the soil or into a mass of finely divided material, and which comprises an elongated body bearing a metal point at its normally lower end and a metal electrical terminal member at substantially its opposite end and conductively connected together; and having a second terminal member non-conductively spaced from said first terminal member and conductively connected to an intermediate metal tube or pipe which is disposed between said point and said terminal, and which provides an electrical resistance through varying amounts of electricity will pass in proportion to the degree of conductivity of the soil or material into which the device is inserted, while being electrically connected, through said two terminals, to a power source such as a battery or the like.

A further object and accomplishment of my invention is the provision of a portable moisture indicating device such as described in the foregoing paragraph, and in which a portable container or casing carries said battery, a relay switch, a signal light, a manually operable switch and electrical circuits connecting said battery, said switch and said light being releasably connectable to the terminals of said portable probe, whereby when said switches are closed, current will flow through said circuits to light said signal light and which will flow through varying degrees from the point through the soil or material to the tube and through the circuit, dependent upon the moisture content of the soil to be visually indicated upon an electrical indicating meter.

It is an object and accomplishment of my invention to provide a portable device of the described class which includes a by-pass circuit, separate from a primary circuit, and which by-pass circuit includes a probe or the like adapted to be easily inserted into the ground or mass of moisture containing material, so that the degree of resistance to passage of electricity through the soil and through said by-pass circuit, and the extent of its conductivity, may be measured and visually indicated on a suitable meter of said device.

Other and further objects of the invention will be apparent from the following description and appended claims, reference being had to the accompanying drawings and numerals of reference thereon.

On the drawings:

Fig. 1 is a perspective view of the exterior of my moisture measuring device embodying the novel features of my invention.

Figure 2 is a cross-sectional view of the portable probe which is insertable into the soil.

Figure 3:
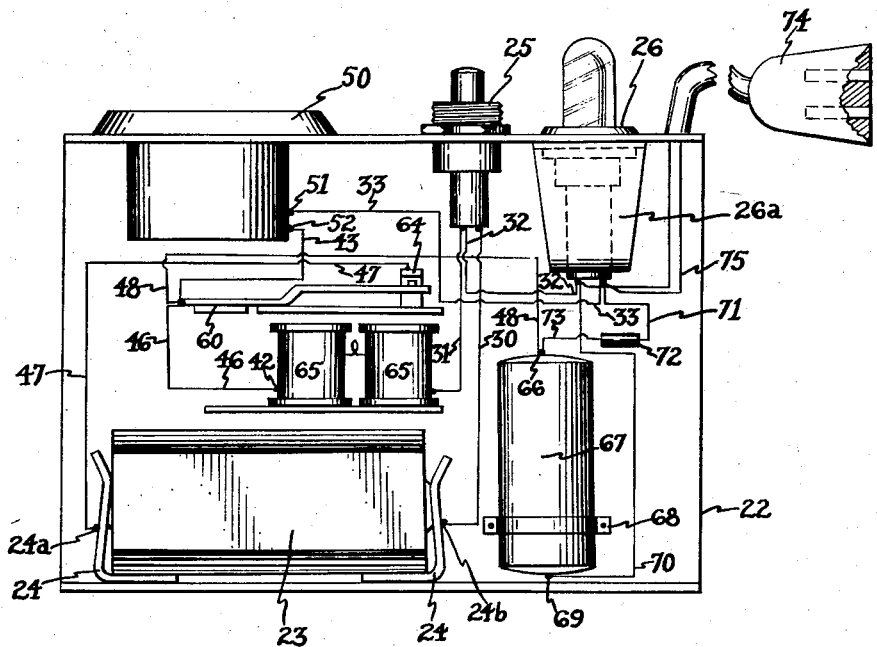
Figure 3 is a partially diagrammatic view illustrating the electrical wiring connections of the respective parts of my device.
Figure 4:
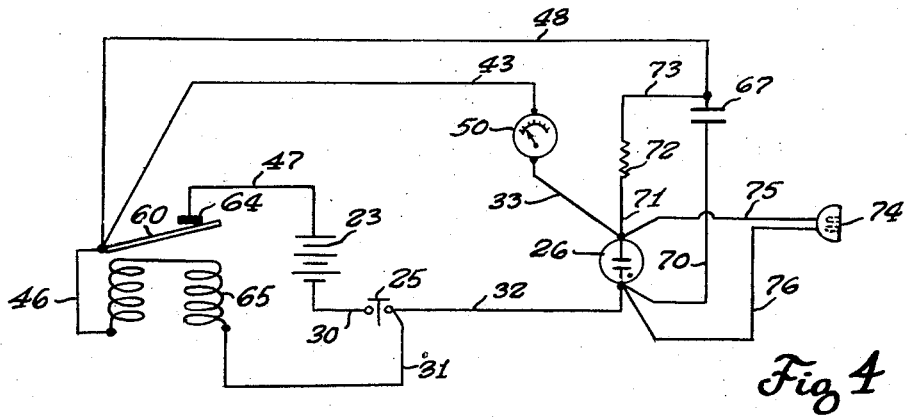
Figure 4 is a diagrammatic view illustrating the wiring connections of the respective parts.

The letter "P" generally designates an elongated probe or metering stick having a tapered metal point 10 which has a threaded central recess 11 formed thereon. Numeral 12 designates a metal connecting rod or pin whose lower end is threaded and which threading engages the threads of point 10.

A passaged plug or spacer 13 of suitable non-conductive material, i.e. rubber, is mounted upon said rod 12, and against the flat end of point 10. An elongated metal tube or pipe 14 is mounted with one end bearing against the flat face of spacer 13. A metal relatively narrow prong 15 having a hole therethrough is mounted on rod 12 and in contact with the upper end of the tube 14. The hole in prong 15 is relatively large so that said prong 15 is out of contact with rod 12.

A centrally apertured non-conductive plug or spacer 16, of rubber or equivalent non-conductive material, is mounted on the upper end of rod 12 and against the upper flat face of prong 15.

A second metal prong 17 which has a central hole therein is mounted on the upper end of rod 12 and upon the upper flat face of spacer 16 and said prong 17 is in conductive contact with said rod.

A cap or nut 18 having a threaded recess is threaded on the upper threaded end of rod 12 and tightening the same impinges the respective parts previously described between it and the point 10.

As shown in Figs. 1 and 2, a suitable plug or socket 74 having a pair of spaced apart recesses and metal terminal members 20 and 21 (shown only in dotted lines), is adapted to be removably mounted upon the spaced metal prongs 15 and 17. The wiring circuits to said terminals 20 and 21 are hereinafter described.

Numeral 22 designates a suitable box, container or casing of substantially rectangular cross section and which has a removable cover 23, which has a plurality of spaced apart apertures therein, as hereinafter described.

*Primary circuit and parts thereof*

The power source comprises a portable battery cell 23, preferably of six volt type, and which is removably secured in the container by means of a pair of metal spring clips 24 which are suitably secured to the non-conductive bottom panel of the container 22 and each of which have spring clip terminals 24a and 24b to facilitate attachment of circuit wires.

As illustrated in Fig. 3, terminal 24b is connected by circuit wire 30 to one terminal of a manually depressible push button switch 25. A circuit wire 31 electrically connects a terminal on the relay 65 to the second terminal of said push button switch 25. Said switch 25 is a single pole manual throw switch used for on-off purposes.

Circuit wire 32 connects one terminal of switch 25 and one terminal of the socket 26a of signal light 26 which is preferably a fluorescent light. Said signal light 26 is preferably a two terminal neon light which requires a minimum of 90 volts, direct current.

A circuit wire 33 connects the second and right hand terminal of socket 26 to terminal 51 of voltmeter 50.

Circuit wire 43 connects terminal 52 of voltmeter 50 to one terminal 42 of a movable relay arm 60 whose movable metal arm is shown as extending to the right of said terminal 42 and which is adapted to be moved downwardly to open position by energization of the relay coils 65. An angular metal contact terminal 64 is suitably mounted to be contacted by the free end of the relay switch arm when the coil 65 is not energized and does not hold said switch in open position. The metal contact plate 64 of said relay switch is connected by a wire 47 to clip terminal 24a of the left battery clip 24. Wire 48 connects the movable contact arm 60 to terminal 66 of condenser 67.

A wire 46 connects terminal 42 of relay switch 60 to the relay switch coil 65. Thus the relay 65 with its associated contacts acts similar to a door-bell or buzzer. The induced voltage of relay 65 is impressed across neon light 26 and series resistor 72 to safely light the said neon light.

As shown in Fig. 3, circuit wire 48 connects terminal 42 of relay switch 60 to terminal 66 of condenser 67, which is suitably mounted as metal clamp 68 with respect to one of the vertical side walls of the container.

Wire 70 connects the terimnal 69 of condenser 67 to the left hand terimnal 38 of socket 26a.

A wire 71 connects the right hand terminal of socket 26a to one end of resistor 72, and a second wire 73 connects the opposite end of said resistor to terminal 66 of condenser 67.

Numeral 74 designates a female socket having two inner terminal plates or contacts. Wire 75 connects one of said terminal plates and the right hand terminal of light socket 26a. Wire 76 connects the other of said terminal plates with the other or left terminal of said light socket.

Said socket 74 is adapted to be removably mounted on the two prongs or fingers of the probe hereinbefore described.

As mentioned previously the combination of said battery cell and relay will build up a voltage sufficient to keep the neon light 26 burning. The neon light impresses a fairly constant voltage across the terminals of the probe shown in Fig. 2. This voltage is approximately ninety volts D.C. Condenser 67 is of a type having approximately .1 uf. Resistor 72 is approximately 3000 ohms, and its function is to create a voltage drop which is measured by voltmeter 50.

When the probe is inserted into the soil and the socket 74 is mounted on prongs of the probe, the operator then depresses the push button of switch 25 and reads the voltmeter 50, the dial of which is suitably calibrated to correspond with the degree of moisture of the soil in the area proximate to the point or tip of said probe.

It will be understood that when there is substantial moisture content in the soil in the area of the point and tube of the probe, the conductivity of the said area of soil is correspondingly greater and the electricity passing through the moist soil will correspondingly increase the voltage reading on voltmeter 50. When the soil is relatively dry, and its conductivity relatively less, this condition will be disclosed on the voltmeter.

In different localities where different soils are encountered, voltmeter 50 may be calibrated by the operator for greater accuracy.

As many changes could be made in the above construction, nad as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a device for measuring the relative moisture content of soil or granular material, a portable probe having an elongated hollow metal body, and having a metal point insulated from said hollow metal body and a metal prong at its normally upper end electrically connected to said point; and a second prong in proximity to said first prong and electrically connected to said metal body; a portable resistance measuring device; a connection plug carried thereby and releasably connected to said prongs; an energy source in said measuring device; a voltmeter; a condenser; a signal element having its terminals connected to the terminals of said connection plug; a resistor; a relay, one contact of said relay operably connected to one contact of said voltmeter, the first contact of said condenser, and one contact of said energy source, and the other contact of said relay being connected to the second contact of said energy source and intermittently permitting flow of energy through said relay from said source; the other contact of the voltmeter connected to the first terminal of said signal element; the first terminal of said signal element being connected to the first contact of said condenser through said resistor; the other contact of the condenser being connected to the other terminal of said signal element; the other contact of the signal element being connected to the other contact of said relay, whereby there is caused an electrical current through the soil and through said probe in varying degrees according to the moisture content of said soil.

2. In a device for indicating the relative moisture content of soil or granular material, a portable elongated probe, having a metal tube, a metal point connected to said tube though non-conductively separated therefrom; a pair of metal projecting fingers at the normally upper end of said probe, said fingers being adapted to receive a terminal plug of an electrical circuit, one of said fingers being conductively connected to said point and the other of said fingers being conductively connected to said tube; and a portable device for indicating the degree of resistance and flow of electricity and including a voltmeter adapted to indicate the humidity of soil, a relay, a switch operable by said relay, a signal light, a condenser, an electrical plug, and a battery, whereby the device is adapted to visually indicate the relative resistance to current flow of the soil in which said probe is inserted, said plug being connected to opposite contact of said signal light, the opposite contacts of the signal light being connected to opposite contacts of said condenser respectively; said signal light connected to the first contact of the relay and the battery and to one contact of the voltmeter; the other contact of the battery being connected to one contact of said switch; the other contact of the switch being connected to the other contact of each said relay and said voltmeter and to said condenser.

3. A device substantially as described in claim 2, and having a manually operable push button switch interposed in one of the circuits of said resistance indicating device.

References Cited in the file of this patent

UNITED STATES PATENTS

| 2,437,134 | Smith | Mar. 2, 1948 |
| 2,673,327 | Morelock | Mar. 23, 1954 |

FOREIGN PATENTS

| 686,051 | Great Britain | Jan. 14, 1953 |